(No Model.)

B. H. BÖRRESON.
VEHICLE WHEEL FENDER.

No. 416,556. Patented Dec. 3, 1889.

Witnesses
H. C. Newman.
Louis G. Julihn.

Inventor
B. H. Börreson,
By his Attorneys
Hopkins & Atkins.

N. PETERS, Photo-Lithographer, Washington, D. C.

UNITED STATES PATENT OFFICE.

BÖRRE HANS BÖRRESON, OF MADISON, WISCONSIN.

VEHICLE-WHEEL FENDER.

SPECIFICATION forming part of Letters Patent No. 416,556, dated December 3, 1889.

Application filed September 11, 1889. Serial No. 323,666. (No model.)

*To all whom it may concern:*

Be it known that I, BÖRRE HANS BÖRRESON, of the city of Madison, county of Dane, State of Wisconsin, have invented a certain new and useful Vehicle-Wheel Fender, of which the following is a specification, reference being had to the accompanying drawings.

The object of my invention is to provide a means of protection against the danger of interlocking of the wheels of colliding vehicles and of striking vehicle-wheel hubs squarely against any other obstruction—as, for instance, a gate or hitching post.

Heretofore when one vehicle was driven against another or against any object of considerable size or stability the force of concussion has been frequently sufficient to damage the vehicle and in some cases to endanger the safety of its occupant.

My invention consists of a spring hub-fender, by which I push a vehicle to one side of an obstruction and avoid all such trouble.

Figure 2:
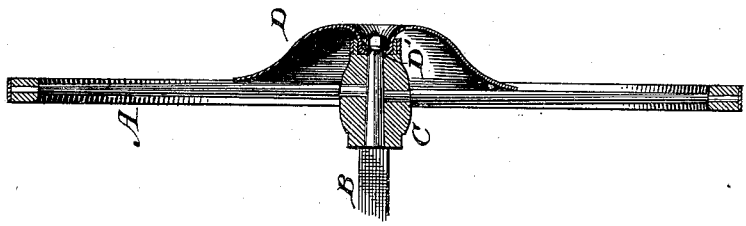
Figure 3:
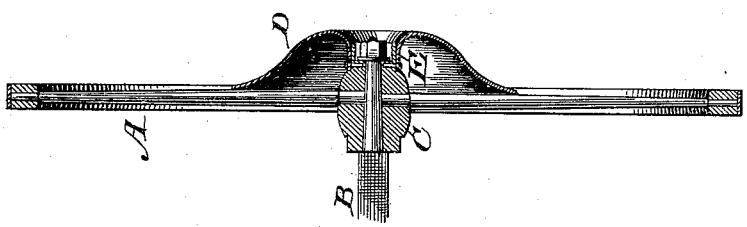
Figure 1:
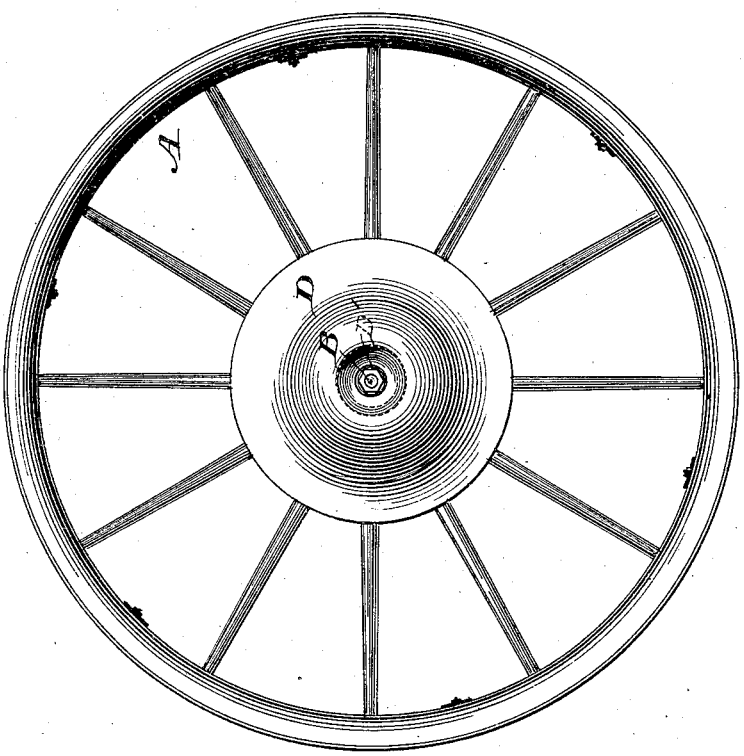

In the accompanying drawings, Figure 1 is a side elevation of a wheel with my improvement attached. Fig. 2 is a central section of the same. Fig. 3 is a section of a modified form of my invention.

Referring to the letters on the drawings, A indicates a wheel, B its axle, and C its hub.

D indicates a fender, which consists of a metal disk having resilient slanting sides.

The fender is open at D' through its center to receive the end of the axle B, and is adapted to be secured in place by the axle-nut, and it forms also a dust guard or shield.

Instead of the construction just described, the flange E, adapted to encircle the hub, may be provided for securing the fender in place upon the hub by screws or other suitable means. It might be secured upon the side of the wheel; but it is preferable to secure it to the hub.

I consider it necessary that my fender-disk shall be made of spring metal, because I find in practice the wheel is relieved of strain occasioned by the shock of collision when the fender is made in this way. It is therefore contemplated that either the inside or the outside edge of my disk shall be free to move upon the hub or upon the spokes of the wheel, respectively, when the disk is subjected to pressure. It may be made ornamental in appearance, by nickel-plating, for instance, so as to enhance the beauty of a carriage to which it is attached, and is adapted to be applied at once to any ordinary road-vehicle now in use without any special provision being made for it.

What I claim is—

A hub-fender consisting of an annular disk having slanting resilient sides and adapted to be secured in place by one of its edges and to have the other edge free to move under pressure, substantially as described.

In testimony of all of which I have hereunto subscribed my name.

BÖRRE HANS BÖRRESON.

Witnesses:
W. W. McCALLUM,
R. O. WESTAD.